United States Patent
Lutz et al.

(10) Patent No.: US 9,834,642 B2
(45) Date of Patent: Dec. 5, 2017

(54) METHOD FOR SEQUENTIALLY SYNTHESISING POLY(ALKOXYAMINE AMIDE)S, COPOLYMERS OBTAINED AND USES THEREOF

(71) Applicant: CENTRE NATIONAL DE LA RECHERCHE SCIENTIFIQUE (ETABLISSEMENT PUBLIC NATIONAL À CARACTÈRE SCIENTIFIQUE ET TECHNOLOGIQUE, Paris (FR)

(72) Inventors: Jean-Francois Lutz, Kehl (DE); Anna Meszynska, Muenden (DE)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/916,004

(22) PCT Filed: Aug. 29, 2014

(86) PCT No.: PCT/FR2014/052147
§ 371 (c)(1),
(2) Date: Mar. 2, 2016

(87) PCT Pub. No.: WO2015/033045
PCT Pub. Date: Mar. 12, 2015

(65) Prior Publication Data
US 2016/0222162 A1   Aug. 4, 2016

(30) Foreign Application Priority Data
Sep. 5, 2013 (FR) ...................... 13 58517

(51) Int. Cl.
C08G 69/00 (2006.01)
H04K 1/00 (2006.01)
G09C 5/00 (2006.01)

(52) U.S. Cl.
CPC ............... *C08G 69/00* (2013.01); *H04K 1/00* (2013.01); *G09C 5/00* (2013.01)

(58) Field of Classification Search
None
See application file for complete search history.

(56) References Cited

U.S. PATENT DOCUMENTS 6,657,043 B1 * 12/2003 Guerret ................ C07C 239/20
525/333.8
2007/0167591 A1 * 7/2007 Couturier ................ C08F 4/00
526/278

FOREIGN PATENT DOCUMENTS

CN  1576280 A  2/2005
DE  19942614 A1  3/2001

OTHER PUBLICATIONS

International Search Report, dated Dec. 4, 2014, from corresponding PCT Application.
Hideyuki Otsuka: "Reorganization of polymer structures based on dynamic covalent chemistry: polymer reactions by dynamic covalent exchanges of alkoxyamine units", Polymer Journal, vol. 45. No. 9, Mar. 6, 2013 (Mar. 6, 2013), pp. 879-891, XP055126221, ISSN: 0032-3896. DOI: 10.1038/pj.2013.17.
Otsuka H et al: "A dynamic (reversible) covalent polymer: radical crossover behaviour of TEMPO-containing poly (alkoxyamine ester)s", Chemical Communications; [6015D]. Royal Society of Chemistry, GB, Oct. 28, 2002 (Oct. 28, 2002), pp. 2838-2839, XP002270860, ISSN: 1359-7345. DOI: 10.1039/B209193C.
Yuji Higaki et al: "Polyurethane Macroinitiator for Controlled Monomer Insertion of Styrene", Macromolecules, vol. 36, No. 5, Feb. 12, 2003 (Feb. 12, 2003). pp. 1494-1499, XP055126207, ISSN: 0024-9297, DOI: 10.1021/ma021091i p. 1497, schema reactionnel 2.

* cited by examiner

*Primary Examiner* — Robert C Boyle
(74) *Attorney, Agent, or Firm* — Young & Thompson

(57) ABSTRACT

Synthesizing poly(alkoxyamine amide)s, which have a monomer chain with at least one thermolabile bond between monomers from an acid monomer of a monohalogenated carboxylic acid X—C(R,R')—Y—COOH and an amine monomer having a free terminal free-radical nitroxide group >N—O° and a free terminal primary amine —NH$^2$. The synthesis involves two separate and chemically selective chemical reactions. One reacts the —COOH and —NH$_2$ groups to obtain an amide bond —NH—CO—Y—C(R, R')—, and the other reacts the —Y—C(R, R')° free-radical with the nitroxide function >N—O° in order to obtain an alkoxyamine bond —Y—C(R, R')—O—N<. The chemical reactions are performed in alternating fashion with catalysts and a novel halogenated acid monomer X—C(R,R')—Y—COOH or a novel free-radical amine monomer having a free terminal group >N—O° and a free terminal primary amine —NH$_2$, until a complete copolymer chain is obtained. Also the polymers obtained and the uses thereof.

14 Claims, No Drawings

METHOD FOR SEQUENTIALLY SYNTHESISING POLY(ALKOXYAMINE AMIDE)S, COPOLYMERS OBTAINED AND USES THEREOF

This invention relates to the field of synthesizing polymers and more particularly the field of synthesizing polymers that have controlled monomer sequences and the use of such polymers, in particular for purposes of encoding or encrypting data.

Actually, one object of the syntheses of polymers having controlled sequences can be that of arranging, in precise order, two or more monomers so as to create a molecular code on a macromolecular chain. Ideally, this code could also be erased using an easy-to-use chemical or physical method.

It has been shown by Merrifield that monodisperse polypeptides having controlled monomer sequences can be synthesized on a solid substrate (cf. Merrifield, J. Am. Chem. Soc., 85, 2149, 1963). This technique has been extended below to the synthesis of other controlled-sequence polymers (for example, oligonucleotides, oligoamides, oligoesters, or oligourethanes). However, these syntheses are often long and tedious because they rely on chemistries for protection and deprotection, which make it possible to deactivate reactive groups temporarily.

It has been shown that the successive use of two different chemically selective reactions makes it possible to synthesize controlled-sequence polymers on a substrate without resorting to chemistries for protection and deprotection (cf. Lutz, J. Am. Chem. Soc., 131, 9195, 2009). For example, monodisperse poly(triazole amide)s can be easily synthesized by this approach. However, the chemical reactions that are used in this method remain fairly slow since several hours are sometimes necessary for attaching a monomer unit to the substrate. A faster method, taking, for example, less than one hour per stage of adding a monomer unit, would be preferable. Moreover, the polymers obtained via this method are relatively chemically and thermally stable and therefore cannot be degraded (i.e., erased within the framework of a coding/decoding method) under permissive experimental conditions.

In this context, this invention has as its object to propose a method for synthesizing monodisperse poly(alkoxyamine amide)s having controlled monomer sequences that remedies at least some of the aforementioned drawbacks.

It also has as its object the poly(alkoxyamine amide) that is obtained or that can be obtained by the method according to the invention and the use of the method according to the invention for the synthesis of a polymer intended to represent a coded message or data store in which the different monomers correspond to a predefined element of said code or data to be stored, for example a binary code of the (0, 1) type, a multinary code, a letter or a sign of the alphanumeric type or the like.

In accordance with this invention, the polymers in question are obtained using two very fast chemically selective chemical reactions. This synthesis method uses two different types of monomers and is described below in the simplified general diagram, provided by way of nonlimiting example:

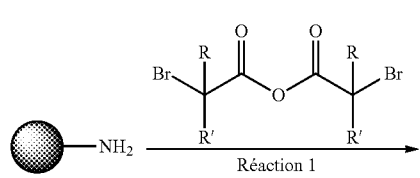
Réaction 1

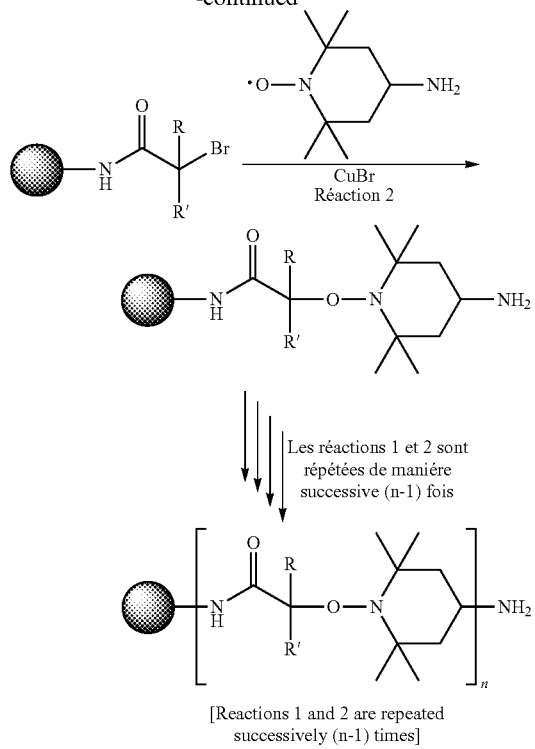

[Reactions 1 and 2 are repeated successively (n-1) times]

[Key: Réaction = Reaction]

The first reaction produces, for example, a primary amine group grafted onto a suitable substrate (shown here symbolically by a sphere) and a dihalogenated symmetrical anhydride that leads, under the selected conditions, to the formation of an amide bond (Reaction 1).

The second reaction produces a stable nitroxide-type radical that is reacted on the previously obtained alkyl halide in the presence of a suitable organometallic or metallic catalyst (Reaction 2). This free-radical coupling reaction leads to the formation of an alkoxyamine bond. This reaction was used for the synthesis of alkoxyamines of low molar mass (cf. Matyjaszewski, Macromolecules, 31, 5955, 1998) and for the synthesis of different macromolecular structures (cf. Hu, Polym. Chem., 4, 2384, 2013).

In contrast, this reaction has not been studied for the synthesis supported by monodisperse polymers having controlled monomer sequences.

The invention will be better understood using the description below, which relates to preferred embodiments, provided by way of nonlimiting examples, and explained with reference to the above-referenced diagram and to the nonlimiting examples below.

This invention therefore has as its object a method for synthesizing synthetic macromolecules or copolymers of the poly(alkoxyamine amide) type, in which the monomer type and the length of the monomer sequences are controlled, in which the monomer chain has at least one bond between monomers that is thermolabile, and in which the separation temperatures are all greater than 30° C., preferably greater than 50° C., and more preferably greater than 60° C., but always less than 150° C., preferably always less than 130° C., characterized in that it consists in reacting, on a soluble or solid substrate, an acid monomer in the form of a monohalogenated carboxylic acid of formula X—C(R,R')—Y—COOH with an amine monomer that has a free terminal nitroxide >N—O• free-radical group and a free terminal primary amine group —NH₂, this by carrying out two chemically selective and separate chemical reactions: one consisting in reacting the aforementioned groups —COOH and —NH₂ in such a way as to obtain an amide bond —NH—CO—Y—C(R,R')—, and the other consisting in reacting the radical —Y—C(R,R')•, obtained in situ using a catalyst adapted to said halogen element X, with said nitroxide >N—O• group so as to obtain an alkoxyamine-type bond —Y—C(R,R')—O—N<, and repeating, alternately, said aforementioned chemical reactions as many times as necessary, in the presence of catalysts suited to the element(s) X, with a new halogenated acid monomer of formula X—C(R,R')—Y—COOH that is identical to or different from the preceding halogenated acid monomers that are used or with a new free-radical amine monomer that has a free terminal >N—O' group and a free terminal primary amine group —NH₂ that is identical to or different from the preceding free-radical amine monomers until the desired complete copolymer chain is obtained.

Advantageously, the method according to the invention is characterized in that the synthesis of the copolymer is initiated on a soluble or solid substrate equipped with a chemically reactive primer group, capable of fixing the aforementioned first amine or acid monomer, and then in that the complementary amine and acid monomers are alternately grafted onto said first monomer, on a rolling basis, until the desired copolymer is obtained, with said substrate preferably being a crosslinked Merrifield-type polystyrene or a soluble polystyrene chain.

In accordance with this invention, a solid substrate or a soluble substrate can be used. This substrate contains a priming group that can be a primary amine (as shown in the diagram above), an alkyl halide, a carboxylic acid, or a nitroxide.

The method according to the invention is therefore characterized in that the solid substrate has—as a primer group—a group —NH₂, —Br, —Cl, —COOH, or a free-radical group that has a free terminal >N—O• group, —NH₂, —Br, or —Cl being preferred.

Next, the monomers are attached one by one to the substrate so as to form a monodisperse segment. According to the type of primer used on the substrate, Reaction 1 or Reaction 2 is carried out first. Later, these two reactions are repeated the desired number of times in a consecutive manner so as to form the desired polymer. Between each reaction, the substrate is separated from the reaction medium so as to eliminate the excess regents and the soluble reaction products in the liquid phase.

Different types of monomers can be used in this method.

The method according to the invention is therefore also characterized in that for the monohalogenated carboxylic acid X—C(R,R')—Y—COOH that is used, X is independently Br or Cl, with R being selected independently from the group that is formed by:

H, CH₃, an alkyl group that has 2 to 6 carbon atoms, optionally substituted or polysubstituted;

with R' being selected independently from the group that is formed by: H, CH₃, an alkyl group that has 2 to 6 carbon atoms, optionally substituted or polysubstituted;

and Y being selected independently from the group that is formed by:

Ø (covalent bond) and —COO—Z—, where Z is a hydrocarbon chain with 1 to 15 carbon atoms, linear, branched or cyclic, optionally substituted or polysubstituted, in particular by groups that are selected from the list that is formed by: —OH, —NH₂, —COOH, —CN, an alkyne group, in particular —C≡C—H, an alkene group, —N₃, —SO₃, with these groups being able to be protected by one or more suitable protective groups.

In particular, the lateral substituents of these monomers can be varied so as to create molecular codes on the polymer chain that is formed. For example, the anhydride of 2-bromoisobutyric acid (1) and the anhydride of 2-bromopropionic acid (2) can be used in an interchangeable manner for forming a polymer that has controlled monomer sequences with, for example, the free radical 4-amino 2,2,6,6-tetramethylpiperidin-1-oxyl (3).

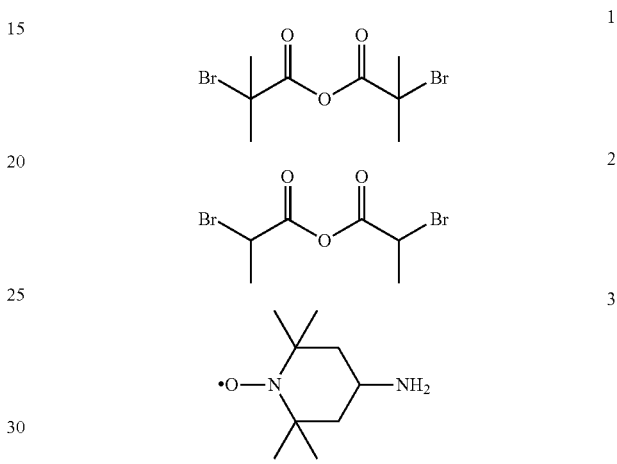

The polymers that are formed contain covalent amide and alkoxyamine bonds and are therefore named poly (alkoxyamine amide)s (4). These polymers are monodisperse and have controlled monomer sequences. Moreover, the alkoxyamine bonds that constitute these polymers are thermolabile and can therefore be easily destabilized above a moderate critical temperature.

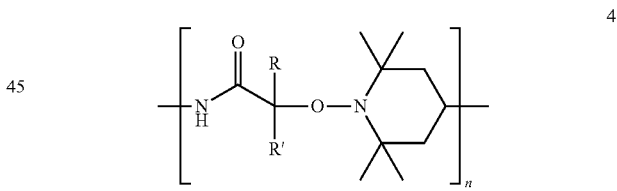

The method according to the invention is therefore also characterized in that the monohalogenated carboxylic acid X—C(R,R')—Y—COOH that is used is obtained in situ by separation, starting from the corresponding dihalogenated symmetrical anhydride of formula X—C(R,R')—Y—CO—O—CO—Y—C(R,R')—X, preferably from 2-bromoisobutyric acid anhydride or 2-bromoproprionic acid anhydride.

According to a preferred embodiment, the method according to the invention is characterized in that the catalyst that is used is a halogenated metal salt, preferably a chloride or bromide of a metal that is selected from the group that is formed by Cu, Ag, Zn, Ni, Pd, Co, Rh, Fe, Ru, Mn, Pt and Au, preferably CuBr when X=Br.

In addition, the method according to the invention is characterized in that the amine monomer that is used is selected from the group that is formed by the following five structures:

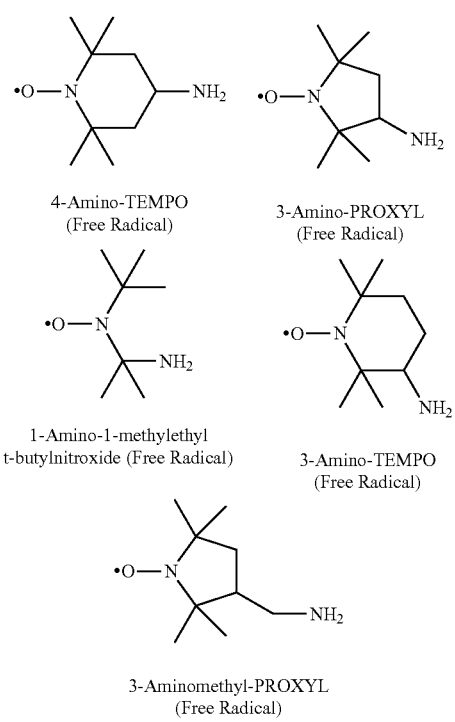

4-Amino-TEMPO
(Free Radical)

3-Amino-PROXYL
(Free Radical)

1-Amino-1-methylethyl
t-butylnitroxide (Free Radical)

3-Amino-TEMPO
(Free Radical)

3-Aminomethyl-PROXYL
(Free Radical)

A particularly preferred embodiment is characterized in that only Br—C(CH$_3$)$_2$—COOH (the case where Y=Ø, i.e., where Y is a single covalent bond) and 4-amino-2,2,6,6-tetramethylpiperidin-1 oxyl (4-amino-TEMPO, free radical) are used with CuBr as catalyst.

This invention also relates to the poly(alkoxyamine amide)s that are obtained or that are able to be obtained by the method according to the invention.

These poly(alkoxyamine amide)s are also characterized in that they comprise multiple sequences of monomers that are separated by multiple thermolabile bonds.

In particular, and according to a particularly advantageous embodiment, the poly(alkoxyamine amide)s according to the invention are characterized in that the thermolabile bonds are chemically identical or different in nature and/or have identical or different separation temperatures.

Finally, this invention also has as its object the use of a poly(alkoxyamine amide) according to the invention for representing a coded message or for storing data in which the different monomers correspond to a predefined element of said code or data to be stored, for example a binary code of the (0, 1) type, a multinary code, a letter or a sign of the alphanumeric type, or the like.

Advantageously, the thermolabile bond(s) make(s) it possible, during a moderate heating stage of the poly(alkoxyamine amide) above a separation temperature of said bond(s), to break said bond(s) and thus at least to alter permanently the body of the coded message or the stored data in such a way that it/they become(s) at least partially incomprehensible and/or unusable after the poly(alkoxyamine amide) is reorganized when it is cooled below the lowest separation temperature.

This invention is now described in more detail in the nonlimiting examples provided below.

EXAMPLE 1: REACTION OF 2-BROMOISOBUTYRIC ACID ANHYDRIDE WITH A PRIMARY AMINE IMMOBILIZED ON A SOLID SUBSTRATE

In this example, 0.3 g (0.237 mmol, 1 equivalent) of a Wang-PS-type commercial resin, functionalized by a glycine protected by an Fmoc-type protective group (functionality of 0.79 mmol/g), was used as a solid substrate. The resin was introduced into a sintered column making possible the solid-phase synthesis. The resin was then inflated by dichloromethane for 30 minutes while being stirred. Then, the Fmoc protective group of the resin was cleaved by a treatment of two times ten minutes in the presence of an equivolumetric mixture of piperidine and dichloromethane. The formation of a primary amine group on the resin was confirmed by a Kaiser-type colorimetric test. Next, a solution of 2-bromoisobutyric acid anhydride (0.37 g, 5 equivalents) and N,N-diisopropylethylamine (0.95 ml) in 4 ml of anhydrous dimethylformamide was added into the column and brought into the presence of resin for 50 minutes while being stirred mechanically at ambient temperature. After reaction, the modified resin was filtered and washed several times with dimethylformamide and then was characterized by a Kaiser-type colorimetric test confirming the quantitative disappearance of the primary amines.

EXAMPLE 2: REACTION OF 2-BROMOPROPANOIC ACID ANHYDRIDE WITH A PRIMARY AMINE IMMOBILIZED ON A SOLID SUBSTRATE

In this example, the conditions of Example 1 were used with the exception of the 2-bromopropanoic acid anhydride that was replaced by the 2-bromoisobutyric acid anhydride.

EXAMPLE 3: REACTION OF 4-AMINO-TEMPO WITH A SOLID SUBSTRATE FUNCTIONALIZED BY AN ALKYL HALIDE

In this example, a glycine-Wang-PS-type resin, functionalized by an alkyl halide (i.e., a modified resin obtained by following the experimental conditions of Example 1 or Example 2), was used as a solid substrate. This resin was placed in a sintered column making possible the solid-phase synthesis and then brought into the presence of a mixture of 4-amino-TEMPO (0.12 g, 3 equivalents), 0.044 g of copper bromide (I) (1.3 equivalents) and 0.07 ml of tris(2-dimethylaminoethyl)amine (1.3 equivalents) in 5 ml of dimethyl sulfoxide. The column was closed by a skirt plug, and the reaction medium was degassed by bubbling argon through it for several minutes. Next, the reaction mixture was stirred for 15 minutes under an inert atmosphere at ambient temperature. After reaction, the modified resin was filtered and then washed several times with dimethylformamide. The resin was characterized by a Kaiser-type colorimetric test confirming its functionalization by primary amines.

EXAMPLE 4: SYNTHESIS OF A MONODISPERSE POLY(ALKOXYAMINE AMIDE) ON A SOLID SUBSTRATE

Monodisperse poly(alkoxyamine amide)s of different sizes have been synthesized on a glycine-Wang-PS-type commercial resin. The experimental procedure consists in alternating Example 1 (or Example 2) and Example 3 a certain number of times so as to construct a macromolecular chain of a desired length. For the amidification stage, the experimental conditions of Example 1 and Example 2 can be used interchangeably. Thus, the 2-bromopropanoic acid anhydride (Example 1) and the 2-bromoisobutyric acid anhydride (Example 2) can be used in a predefined order during the same synthesis so as to create binary-type controlled monomer sequences. When the required size is reached for the polymer, the latter can be removed from the substrate by reacting the modified resin with an equivolumetric mixture of trifluoroacetic acid and dichloromethane for 2 hours. The poly(alkoxyamine amide) is then isolated by precipitation in the cold diethyl ether. The polymers that are formed were characterized by NMR of the proton and by steric exclusion chromatography in tetrahydrofuran. In all of the cases, the NMR of the proton confirmed the formation of a poly(alkoxyamine amide). In addition, the measurements of steric exclusion chromatography confirm the formation of isomolecular radicals (the polymolecularity indices are between 1.00 and 1.05 according to the tests). For example, for a polymer that is obtained after 9 successive synthesis stages, a mean molar mass of an apparent number of approximately 1270 g mol$^{-1}$ and a polymolecularity index of 1.03 have been determined by steric exclusion chromatography.

EXAMPLE 5: REACTION OF 4-AMINO-TEMPO WITH A SOLUBLE POLYSTYRENE SUBSTRATE HAVING AN ALKYL HALIDE AT THE END OF THE CHAIN

In this example, linear polystyrene chains ($M_n$=4,000 g·mol$^{-1}$, $M_w/M_n$=1.11), prepared by free-radical polymerization controlled by atom transfer, were used as a soluble substrate. One of the two chain ends of this polystyrene is functionalized by a bromine atom, with the other end being functionalized by an inert group. 1.8 g of this soluble polystyrene substrate (1 equivalent), 0.23 g of 4-amino-TEMPO (3 equivalents), 0.084 g of copper (I) bromide (1.3 equivalents), and 0.14 ml of tris(2-dimethylaminoethyl) amine (1.3 equivalents) were introduced into a glass flask and then dissolved in a mixture of tetrahydrofuran (2.8 ml) and dimethyl sulfoxide (1.7 ml). The flask was closed by a skirt plug, and the reaction medium was degassed by bubbling argon through it for several minutes. Next, the reaction mixture was stirred for 15 minutes under an inert atmosphere at ambient temperature. After reaction, the modified polystyrene was purified by precipitation in methanol, washed and then dried under vacuum. The formed polymer was characterized by NMR of the proton and by steric exclusion chromatography in tetrahydrofuran. These two methods confirmed the attachment of a 4-amino-TEMPO unit on the polystyrene chain.

EXAMPLE 6: REACTION OF 2-BROMOISOBUTYRIC ACID ANHYDRIDE WITH A SOLUBLE POLYSTYRENE SUBSTRATE HAVING A PRIMARY AMINE AT THE END OF THE CHAIN

In this example, linear polystyrene chains having a primary amine at the end of the chain (i.e., a modified polymer obtained by following the experimental conditions of Example 5) were used as a soluble substrate. 1.75 g of this soluble polystyrene substrate (1 equivalent), 0.69 g of 2-bromoisobutyric acid (5 equivalents), and 1.75 ml of N,N-diisopropylethylamine were introduced into a glass flask and dissolved in 4 ml of anhydrous dichloromethane. The reaction medium was then stirred for 50 minutes at ambient temperature. After reaction, the modified polystyrene was purified by precipitation in methanol, washed, and then dried under vacuum. The formed polymer was characterized by NMR of the proton and by steric exclusion chromatography in tetrahydrofuran. These two methods confirmed the attachment of a 2-bromoisobutyric acid unit on the polystyrene chain.

EXAMPLE 7: SYNTHESIS OF A MONODISPERSE POLY(ALKOXYAMINE AMIDE) ON A SOLUBLE SUBSTRATE

Poly(alkoxyamine amide)s of different sizes were synthesized on soluble polystyrene substrates having a terminal bromine atom. The experimental procedure consists in alternating Example 5 and Example 6 a certain number of times so as to construct a macromolecular chain of a desired length. After each synthesis stage, the formed polymers were characterized by NMR of the proton and by steric exclusion chromatography in tetrahydrofuran. These two methods of analysis confirmed the iterative formation of a poly(alkoxyamine amide).

EXAMPLE 8: FAST THERMAL DESTRUCTION OF A MONODISPERSE POLY(ALKOXYAMINE AMIDE

In this example, 50 mg of monodisperse poly(alkoxyamine amide) (M=1143 g·mol$^{-1}$) was introduced into a flask and dissolved in 8.75 ml of anisole. The mixture is heated to 125° C. for 3 hours. The formed polymer was characterized by steric exclusion chromatography in tetrahydrofuran. This method of analysis showed the transformation of the monodisperse polymer into a polydisperse radical.

EXAMPLE 9: SLOW THERMAL DESTRUCTION OF A MONODISPERSE POLY(ALKOXYAMINE AMIDE)

In this example, 60 mg of monodisperse poly(alkoxyamine amide) (M=1143 g·mol$^{-1}$) was introduced into a flask and dissolved in 10.5 ml of anisole. The mixture is heated to 75° C. for 24 hours. The formed polymer was characterized by steric exclusion chromatography in tetrahydrofuran. This method of analysis showed the transformation of the monodisperse polymer into a polydisperse radical.

The method according to the invention makes it possible to produce poly(alkoxyamine amide)s that typically have up to 100 monomer units, preferably 5 to 100 units, more preferably 5 to 50 monomer units, and even more preferably 5 to 25 monomer units.

Of course, the invention is not limited to the embodiments described. Modifications remain possible, in particular from the standpoint of the composition of the various elements or by substitution of equivalent techniques, without thereby exceeding the scope of protection of the invention.

The invention claimed is:
1. Method for synthesizing poly(alkoxyamine amide) macromolecules or copolymers comprising
   (A) reacting a first monohalogenated carboxylic acid monomer of the formula X—CRR'—Y—COOH with a first amine monomer having a free terminal nitroxide free radical group (N—O—) and a terminal primary amine group (—NH$_2$) where the reacting consists of two chemical reactions, the first reaction consisting of a reaction between the —COOH groups and the —NH$_2$ group to form an amide group (—NH—CO—Y—CRR'—) and the second reaction consisting of a reaction between the halogen X on the monohalogenated carboxylic acid monomer (—Y—CRR'—X) with a catalyst to form a radical (—Y—CRR'—) which reacts with the nitroxide free radical group (N—O—) to form an alkoxyamine group (—Y—CRR'—O—N—), (B) repeating the reaction of step (A) with the same or a different monohalogenated carboxylic acid monomer and the same or a different amine monomer to form a poly(alkoxyamine amide) macromolecule or copolymer, where each X is independently a halogen, where each R is independently selected from the group consisting of H, CH$_3$, an alkyl group that has 2 to 6 carbon atoms optionally substituted, where each R' is independently selected from the group consisting of H, CH$_3$, an alkyl group that has 2 to 6 carbon atoms optionally substituted, where each Y is independently selected from the group consisting of a covalent bond and —COO—Z— where Z is a linear, branched, or cyclic hydrocarbon chain with 1 to 15 carbon atoms which is optionally substituted by a functional group selected from the group consisting of —OH, —NH$_3$, —COOH, —CN, an alkyne group, an alkene group —N$_2$, —SO$_3$, where the poly(alkyoxyamine amide) macromolecule or copolymer has at least one thermolabile bond between the monomers where the thermolabile bond has a dissociation temperature and the dissociation temperature is greater than 30° C. and less than 150° C., and where the reaction of step (A) takes place in solution or on a solid substrate.

2. The method according to claim 1, wherein the reaction of step (A) is initiated on a solid substrate equipped with a chemically reactive primer group, which reacts with either the first amine or the first monohalogenated carboxylic acid monomer to fix a monomer to the substrate.

3. The method according to claim 2, wherein the chemically reactive primer group on the solid substrate is selected from the group consisting of —NH$_2$, —Br, —Cl, —COOH, and a terminal free radical nitroxide.

4. The method according to claim 1, wherein for the first monohalogenated carboxylic acid X—C(R,R')—Y—COOH, X is independently selected from the group consisting of Br and Cl.

5. The method according to claim 4, wherein prior to step (A), the first monohalogenated carboxylic acid is obtained by separating the first monohalogenated carboxylic acid from a corresponding dihalogenated symmetrical anhydride of the formula X—CRR'—Y—CO—O—CO—Y—CRR'—X.

6. The method according to claim 1, wherein the catalyst that is used is a halogenated metal salt.

7. The method according to claim 1, wherein the first amine monomer is selected from the group consisting of:

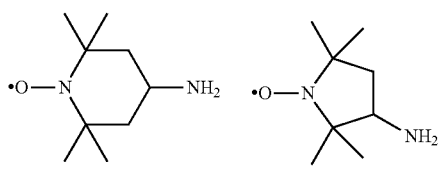

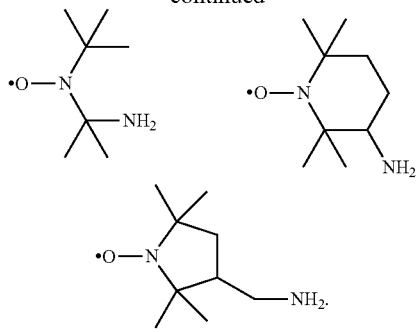

8. The method according to claim 1, wherein first monohalogenated carboxylic acid monomer is Br—C(CH$_3$)$_2$—COOH and first amine monomer is

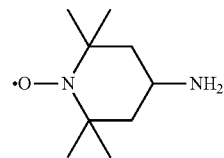

and the catalyst is CuBr.

9. Poly(alkoxyamine amide) that is obtained by the method according to claim 1.

10. The poly(alkoxyamine amide) according to claim 9, comprising more than one different monohalogenated carboxylic acid monomer and more one than different amine monomer resulting in more than one thermolabile bond.

11. The poly(alkoxyamine amide) according to claim 10, wherein the more than one thermolabile bonds have identical or different dissociation temperatures.

12. A method of making a coded message or data store, comprising forming an element of a code or data to be stored from the poly(alkoxyamine amide) according to claim 9, wherein said element is selected from the group consisting of a binary code, a multinary code, a letter and a sign of the alphanumeric.

13. The method according to claim 12, wherein the thermolabile bond(s), during a heating stage of the poly (alkoxyamine amide) above a dissociation temperature of said thermolabile bond(s), breaks said thermolabile bond(s) and thus at least alters permanently the coded message or the stored data resulting in the coded message or the stored data becoming at least partially incomprehensible and/or unusable.

14. A coded message or data store, comprising the poly (alkoxyamine amide) correspond to claim 9, wherein different monomers of the poly(alkoxyamine amide) correspond to a predefined element of said code or data to be stored, and wherein thermolabile bond(s) of the poly (alkoxyamine amide) during a heating stage of the poly (akoxyamine amide) above a dissociation temperature of said thermolabile bond(s), breaks said thermolabile bond(s) and thus at least alters permanently the coded message or the stored data in such a way that the coded message or the stored data becomes at least partially incomprehensible and/or unusable.

* * * * *